United States Patent [19]

Watanabe

[11] Patent Number: 5,357,445
[45] Date of Patent: Oct. 18, 1994

[54] TAPER ANGLE SETTING AND DISPLAYING METHOD FOR PROGRAMMING UNIT

[75] Inventor: Naoki Watanabe, Aichi, Japan

[73] Assignee: Mitsubishi Denki Kabushiki Kaisha, Tokyo, Japan

[21] Appl. No.: 511,695

[22] Filed: Apr. 20, 1990

[30] Foreign Application Priority Data

May 30, 1989 [JP] Japan .................. 1-136347

[51] Int. Cl.$^5$ .............................. G06F 15/46
[52] U.S. Cl. .................. 364/474.26; 364/474.04; 364/474.22; 219/69.12
[58] Field of Search .................. 364/188, 189, 474.04, 364/474.11, 474.22, 474.24, 474.25, 474.26, 474.34; 219/69.12, 69.13, 69.17, 69.2

[56] References Cited

U.S. PATENT DOCUMENTS

| | | | |
|---|---|---|---|
| 4,644,124 | 2/1987 | Hori et al. | 219/69.17 |
| 4,703,146 | 10/1987 | Kinoshita | 364/474.34 |
| 4,713,517 | 12/1987 | Kinoshita | 219/69.12 |
| 4,933,865 | 6/1990 | Yamamoto et al. | 364/474.24 |
| 5,006,691 | 4/1991 | Nakayama | 364/474.04 |
| 5,012,063 | 4/1991 | Kawanabe | 219/69.12 |
| 5,051,912 | 9/1991 | Johanson et al. | 364/474.04 |
| 5,177,689 | 1/1993 | Kinasi et al. | 364/474.26 |

*Primary Examiner*—Jerry Smith
*Assistant Examiner*—Thomas E. Brown
*Attorney, Agent, or Firm*—Sughrue, Mion, Zinn, Macpeak & Seas

[57] ABSTRACT

In a taper angle setting and displaying method, the inclination angle and inclination direction of a taper specified on a machining locus that is defined on a display screen is displayed, as a taper indicating symbol including the inclination angle, on either the right or left of the machining locus, whereby the angle and direction of the taper can be visually confirmed on the display screen.

4 Claims, 4 Drawing Sheets

TAPER ANGLE SETTING AND DISPLAYING METHOD FOR PROGRAMMING UNIT

BACKGROUND OF THE INVENTION

1. Field of the Invention

This invention relates to a taper angle setting and displaying method for a programming unit in which machining configurations are defined on a display unit (such as a cathode ray tube) and machining programs are automatically outputted according to the machining configurations thus defined.

2. Prior Art

A conventional method of displaying machining loci for a programming unit will be described with reference to FIGS. 5 through 8.

In FIG. 5, reference character L1 designates a machining locus extended from a machining start point P1, and L2 through L5, machining loci along a machining configuration. FIGS. 6(a) to 6(d) are top view, side view, front view, and perspective view of a tapered object formed by machining a workpiece according to the machining method shown in FIG. 5, respectively. FIG. 7 is a flow chart showing a conventional method of specifying taper angles. FIG. 8 shows a part of a program including machining data in formation of the tapered object shown in FIG. 6. The program additionally includes taper specifying data.

In order to form a machining program for machining a workpiece into a tapered object as shown in FIG. 6, the elements such as points, lines and circles forming the contour of the upper or lower surface of the tapered object are defined (Step 40), and thereafter machining paths are defined in the order of the machining loci L1 through L5 starting from the machining start point P1 (Step 41). The above-described operations have formed, a program for straightly machining the workpiece. However, in the case where the workpiece is to be machined into a tapered object as shown in FIG. 6, it is necessary to add taper data. In general, it is not always possible to apply one and the same taper data to all of the elements of the machining contour; that is, different elements generally have different taper angles. Accordingly, in the program, it is necessary to define a taper angle for every machining path. In addition, in the program, a taper angle must be defined with a positive sign or negative sign in accordance with the direction of the taper angle. That is, in a taper angle specifying method for a numerical control device, when a taper is inclined left with respect to the machining direction, the taper angle is provided with the negative sign, and when inclined right, the taper angle is provided with the positive sign. (In some numerical control devices, a positive taper angle is given at all times, and the sign is selected using NC code (such as G code).

Accordingly, for each element, a taper angle provided for each element by taking a taper inclination into account is inserted in the definition of a machining path (Step 42). The program thus formed is as shown in FIG. 8. After the elements, such as P1, L1 and L2, of the machining contour have been defined, the machining elements P1, L1, L2, etc. are inputted according to the machining direction, and then taper specifying data, namely, taper angle data are inserted between the elements thus inputted.

The machining-direction-indicating arrows are indicated on the machining paths L1 through L5 in FIG. 5; however, in practice they are not displayed.

The conventional method of setting and displaying taper angles for a programming unit is as described above. That is, after a machining direction has been determined, a taper angle must be determined (with a positive or negative sign) by taking the machining direction into account. Therefore, even in the case where, although the machining configuration is the same, the machining direction is opposite, it is necessary to set taper angles for all the machining loci again. This means that it is necessary to provide two machining programs; a program for forward machining, and a program for reverse machining, thus greatly lowering the work efficiency of the numerical control device. Furthermore, in the conventional method, although the machining loci are displayed, the taper specifying data for the machining elements are not displayed. That is, the taper specifying data (taper angle and taper direction) cannot be confirmed on the display screen.

SUMMARY OF THE INVENTION

Accordingly, an object of this invention is to eliminate the above-described difficulties accompanying a conventional taper angle setting and displaying method for a programming device.

More specifically, an object of the invention is to provide a taper angle setting and displaying method for a programming device in which taper angles can be specified with positive sign for machining loci at all times, and the taper directions thereof can be indicated on the display screen, and the results of indication can be confirmed on the display screen with ease.

The foregoing object and other objects of the invention have been achieved by the provision of a taper angle setting and displaying method for a programming device, which, according to the invention, comprises: a step of specifying on a display screen an indication point which is used for a tapering operation at a desired position on a machining locus defined on the display screen; a step of specifying on the display screen an inclination angle of a taper formed by the tapering operation; a step of selecting a position with respect to the machining locus to specify an inclination direction of the taper on the display screen; and a step of displaying the inclination angle and inclination direction thus specified, as a taper indicating symbol, on a side of the machining locus.

The nature, principle and utility of the invention will become more apparent from the following detailed description when read in conjunction with the accompanying drawings.

DETAILED DESCRIPTION OF THE PREFERRED EMBODIMENTS

One example of a taper angle setting and displaying method according to this invention will be described with reference to FIGS. 1 through 4.

Figure 1:
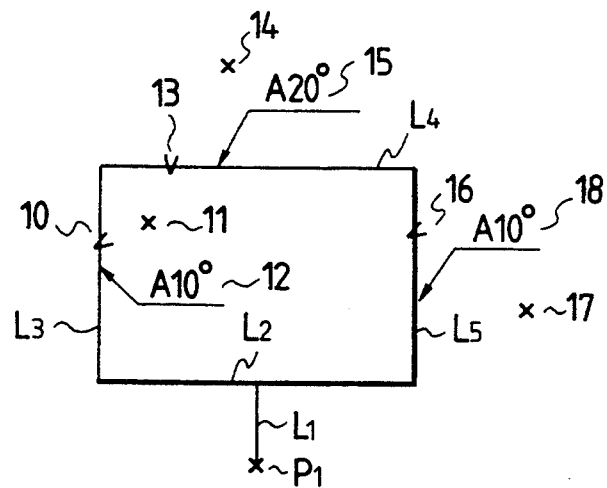
FIG. 1 is an explanatory diagram for a description of one example of a taper angle and displaying method according to this invention.
Figure 2A:
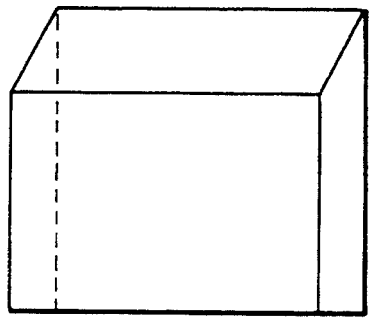
FIGS. 2(a), 2(b) and 2((c) are a top view, front view, and right side view of a tapered object which is formed by machining a workpiece according to the machining method as shown in FIG. 1, respectively.
Figure 2C:
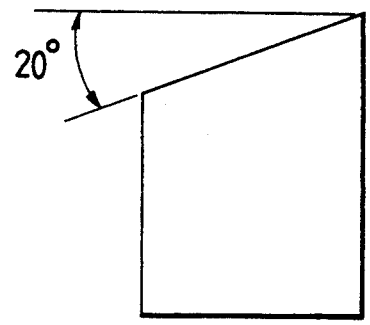
Figure 2B:
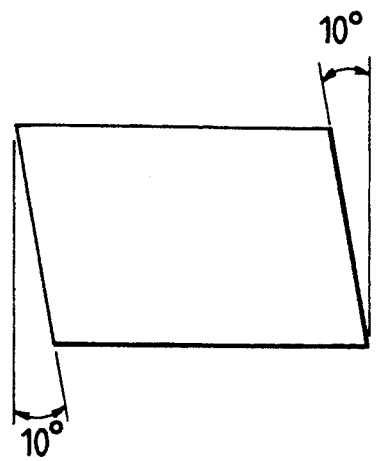
Figure 4:
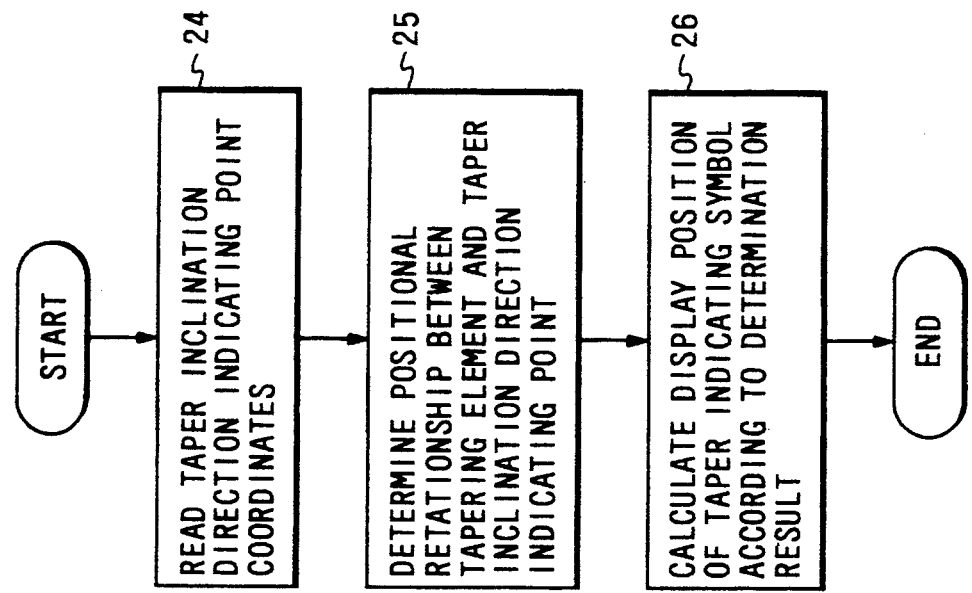
FIG. 4 is a flow chart for a description of the display of taper indicating symbols according to the method of the invention.
Figure 3:
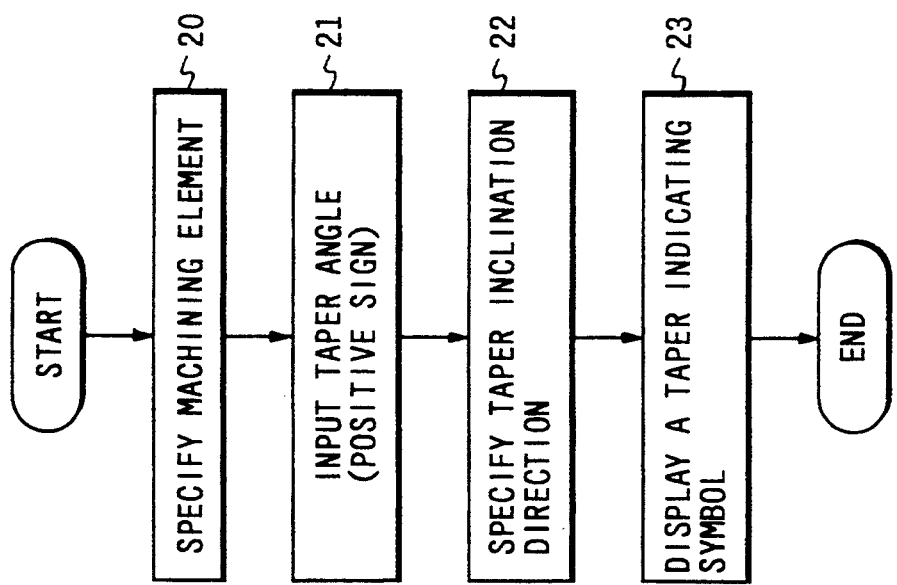
FIG. 3 is a flow chart for a description of the method of setting and displaying taper angle according to the invention.
Figure 5:
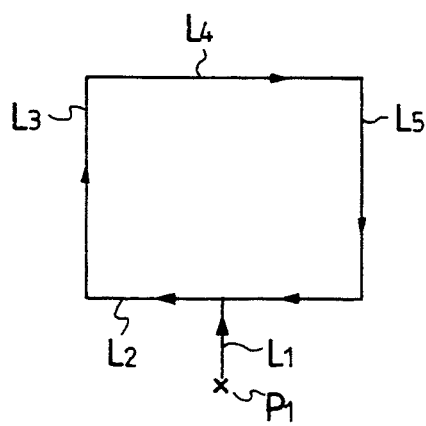
FIG. 5 is an explanatory diagram showing a conventional method of displaying a machining locus.
Figure 6A:
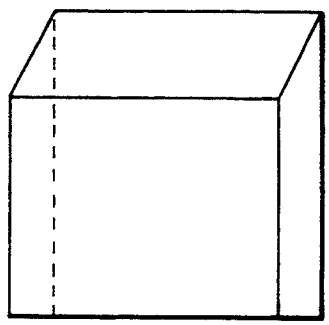
FIGS. 6(a), 6(b), 6(c) and 6(d) are a top view, side view, front view, and perspective view of a tapered object which is formed by machining a workpiece according to the machining method shown in FIG. 5, respectively.
Figure 6B:
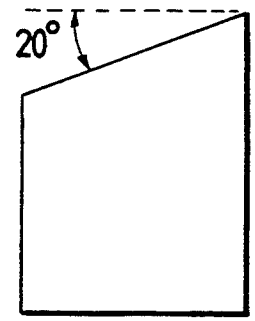
Figure 6C:
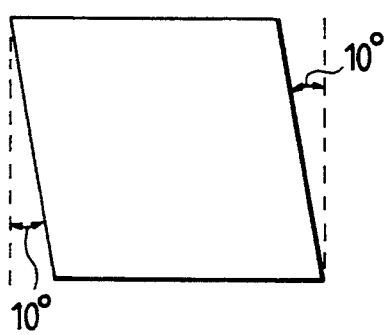
Figure 6D:
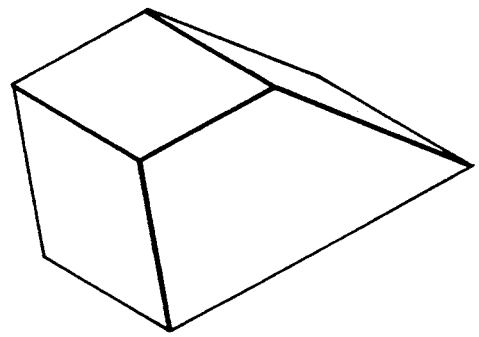
Figure 8:
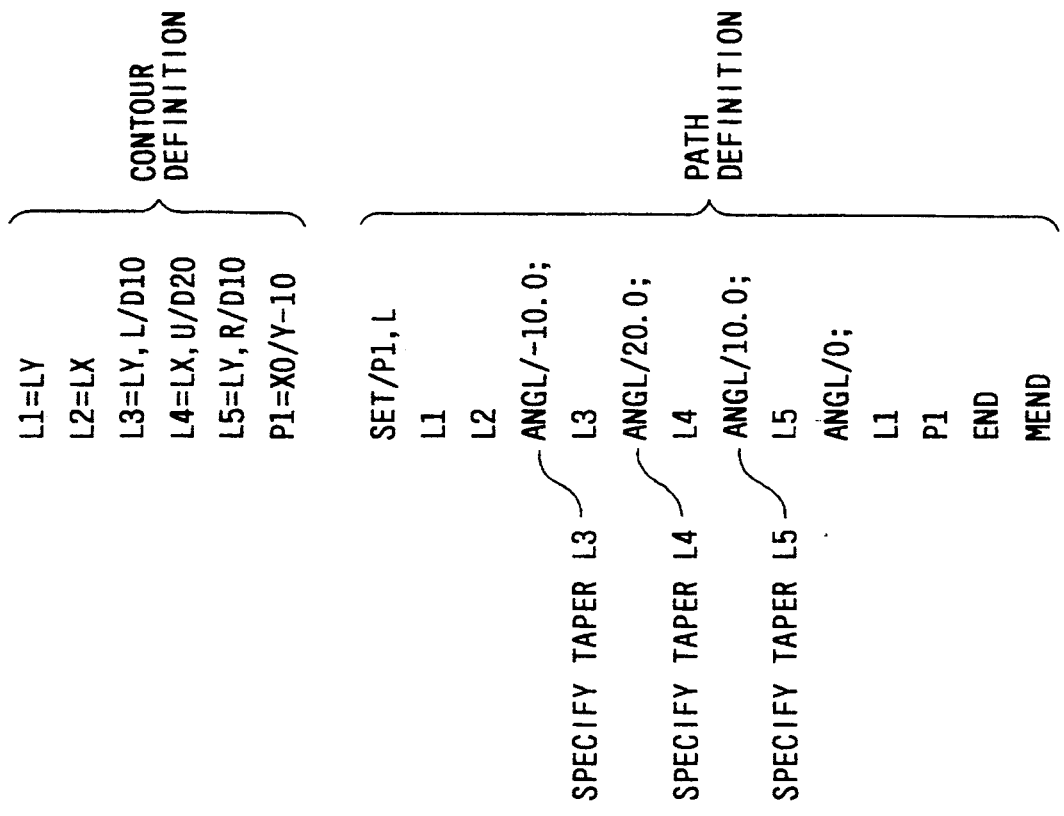
FIG. 8 is a diagram showing a part of a program formed according to a conventional method of specifying taper angle.
Figure 7:
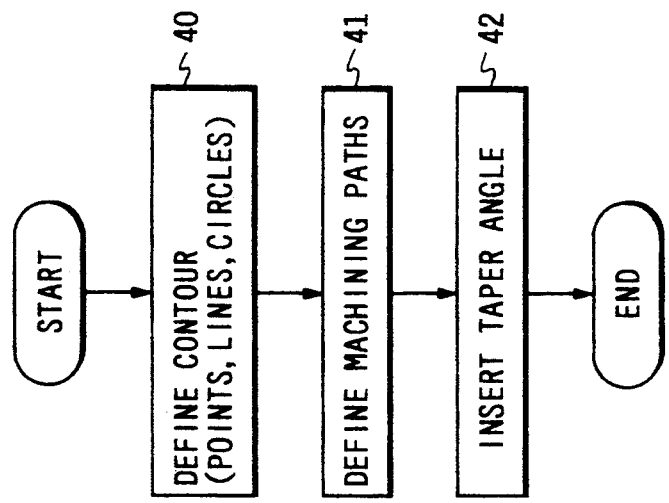
FIG. 7 is a flow chart showing a conventional operation of programming the configuration of a tapered object.

In FIG. 1, reference characters P1, and L1 through L5 designate a machining start point, and machining loci, respectively, similarly as in FIG. 5; 10, an indication point provided when the machining locus L3 is specified; 11, an indication point provided when a taper inclination direction is specified for the machining locus L3; 12, a taper indicating symbol (line) indicating a taper angle and a taper inclination direction for the machining locus L3. Further in FIG. 1, similarly reference numerals 13 and 16 designate indication points provided when the machining loci L4 and L5 are specified, respectively; 14 and 17, indication points provided when taper inclination directions are specified for the machining loci L4 and L5, respectively; and 15 and 18, taper indicating symbols (lines) indicating taper angles and taper inclination direction for the machining loci L4 and L5, respectively. FIGS. 2(a), 2(b) and 2(c) are a top view, front view, and right side view of a tapered object which is formed by machining a workpiece according to the machining method as shown in FIG. 1, respectively.

The definition of the machining start point P1 and the machining loci L1 through L5 are carried out similarly as in the above-described conventional method. In specifying a taper angle for a machining locus, L3 for instance, the indication point 10 on the machining locus L3 is specified with mouse cursor means (Step 20), and the taper angle is inputted without the sign (the sign being not taken into account) (Step 21). Thereafter, the taper inclination direction is inputted by specifying a point with respect to the machining locus L3 which has been specified before; that is, a point 11 which is on one side of the machining locus L3 (Step 22).

Through the above-described operations, taper specifying data are automatically recorded in the programming system. This will be described with reference to FIG. 4. The coordinates of the taper inclination direction indicating point which has been specified in Step 22 is read (Step 24), and the positional relationship between the coordinates thus read and the tapering element specified in Step 20 is determined (Step 25). According to the result of determination, the display position of the taper indicating symbol relative to the taper specifying element is calculated (Step 26). Through the above-described operations, the taper data applied to the machining locus L3 are displayed, as the taper indicating symbol 12, together with the taper angle on one side (where the arrow is provided) of the machining locus L3 (the top character "A" of the taper indicating symbol represents tapering, and the numeral following the character "A" indicates a taper angle) (Step 23). The display of the taper indicating symbol allows the operator to visually confirm the taper inclination direction on the display screen. Furthermore, the relationships between the taper specifying element and the taper inclination direction are stored in the system through the above-described determination, and therefore in outputting NC data, the sign of the taper angle can be selected according to the machining direction.

Similarly, taper angles are specified for the machining loci L4 and L5, and the taper data are displayed on the screen by using the taper indicating symbols.

The taper data thus stored in the system are so utilized that numerical control data are outputted with taper angles provided at suitable points on the machining loci according to the machining directions.

As was described above, in the taper and setting and displaying method of the invention, the taper inclination angle and taper inclination direction specified on the machining locus which is defined on the display screen are displayed, as the taper indicating symbol including the taper inclination angle, on a side of the machining locus. Therefore, it is unnecessary to specify a taper angle with the machining direction taken into account. Furthermore, the taper inclination direction can be specified on the display screen, and the result of specification can be visually confirmed on the display screen. Hence, programming for a machining configuration including tapers can be achieved with ease and with high accuracy; that is, the programming operation can be achieved with high efficiency.

What is claimed is:

1. A method of setting and displaying a taper angle for a programming device, comprising the steps of:

defining a machining locus on a display screen;

specifying on said display screen an indication point which is used for a tapering operation at a desired position on said machining locus defined on said display screen;

specifying on said display screen an inclination angle of a taper formed by said tapering operation;

selecting a relative position with respect to said machining locus to specify an inclination direction of said taper on said display screen; and displaying said inclination angle and inclination direction thus specified, as a taper indicating symbol, on a side of said machining locus.

2. A method as claimed in claim 1, further comprising the step of recording said inclination angle and inclination direction in a programming system.

3. A method of setting and displaying a machining locus on a display device, the method for use with a programming device that is used to create a machining program, the machining program being used by a machine tool to automatically machine a workpiece under control of the machining program in accordance with the machining locus set and displayed, the method comprising the steps of:

defining on said display device a machining locus representative of the machining path to be followed by said machine tool when machining said workpiece;

specifying on said display device a deviation point on said machining locus at which point a deviation machining operation is to be performed by said machine tool on said workpiece, the deviation machining operation including machining of said workpiece in a plane different from that of machining operations at prior points along said machining locus;

specifying on said display device an inclination angle for said deviation machining operation;

specifying on said display device an inclination direction for said deviation machining operation; and displaying on said display device said inclination angle and inclination direction thus specified as a deviation indicating symbol with said machining locus.

4. The method of setting and displaying a machining locus as recited in claim 3, wherein said deviation machining operation is a tapering operation.

* * * * *